United States Patent [19]

Wolf et al.

[11] Patent Number: 5,727,018
[45] Date of Patent: Mar. 10, 1998

[54] PROCESS FOR OBTAINING A SIGNAL INDICATING A SYNCHRONIZATION ERROR BETWEEN A PSEUDO-RANDOM SIGNAL SEQUENCE FROM A TRANSMITTER AND A REFERENCE PSEUDO-RANDOM SIGNAL SEQUENCE FROM A RECEIVER

[75] Inventors: Andreas Wolf; Hans-Werner Arweiler, both of Berlin, Germany

[73] Assignee: Siemens Aktiengesellschaft, Munich, Germany

[21] Appl. No.: 553,447

[22] PCT Filed: May 6, 1994

[86] PCT No.: PCT/DE94/00553

§ 371 Date: Nov. 28, 1995

§ 102(e) Date: Nov. 28, 1995

[87] PCT Pub. No.: WO94/28652

PCT Pub. Date: Dec. 8, 1994

[30] Foreign Application Priority Data

May 28, 1993 [DE] Germany ............... 43 18 368.9

[51] Int. Cl.⁶ .................. H04B 1/69; H04B 3/46
[52] U.S. Cl. .......... 375/210; 375/367; 371/47.1; 371/5.4; 370/515
[58] Field of Search ............... 375/200, 206, 375/208, 210, 357, 359, 367, 371; 370/504, 515; 371/47.1, 5.2, 5.4; 395/2.27; 380/46, 48

[56] References Cited

U.S. PATENT DOCUMENTS

| | | |
|---|---|---|
| 4,441,192 | 4/1984 | Kita et al. . |
| 4,553,251 | 11/1985 | Hartmann ............... 375/114 |
| 4,567,588 | 1/1986 | Jerrim ............... 375/210 |
| 4,601,047 | 7/1986 | Horwitz et al. ............... 375/210 |
| 4,644,523 | 2/1987 | Horwitz . |
| 4,701,939 | 10/1987 | Stutt et al. ............... 375/115 |
| 5,146,462 | 9/1992 | Cucchi ............... 371/47.1 |
| 5,199,050 | 3/1993 | Linsky ............... 375/115 |
| 5,392,314 | 2/1995 | Wolf . |
| 5,504,781 | 4/1996 | Wolf ............... 372/242 |

FOREIGN PATENT DOCUMENTS

| | | |
|---|---|---|
| 0 408 936 | 1/1991 | European Pat. Off. . |
| 23 59 716 | 7/1979 | Germany . |
| 40 12 850 | 10/1991 | Germany . |
| 41 07 640 | 9/1992 | Germany . |
| 41 21 480 | 2/1993 | Germany . |

OTHER PUBLICATIONS

A. Wolf, "Messprazision auf breitem band," Telecom Report, vol. 14, No.2, pp. 104–107 (Mar./Apr. 1991).

*Primary Examiner*—Wellington Chin
*Assistant Examiner*—Jean B. Corrielus
*Attorney, Agent, or Firm*—Kenyon & Kenyon

[57] ABSTRACT

A process may be implemented which obtains a signal indicating a synchronization error between a pseudo-random signal sequence from a transmitter and a reference pseudo-random signal sequence from a receiver in a measuring device on the receiving end. In order to be able to detect a synchronization error as quickly and reliably as possible, successive sections (a, b, c) of a reference pseudo-random signal sequence (g'(n)) are each cross-correlated separately with the received pseudo-random signal sequence (g(n)), yielding partial cross-correlation functions ($KKF_a(n)$, $KKF_b(n)$ and $KKF_c(n)$). The partial cross-correlation functions are added up to obtain a sum cross-correlation function ($KKF_s(n)$). The sum cross-correlation function ($KKF_s(n)$) is analyzed to detect the proper chronological occurrence of at least three maximums ($m_a$, $m_b$ and $m_c$). If the maximums ($m_a$, $m_b$ and $m_c$) do not occur at the proper times, a signal (synch) indicating a synchronization error is generated.

16 Claims, 4 Drawing Sheets

PROCESS FOR OBTAINING A SIGNAL INDICATING A SYNCHRONIZATION ERROR BETWEEN A PSEUDO-RANDOM SIGNAL SEQUENCE FROM A TRANSMITTER AND A REFERENCE PSEUDO-RANDOM SIGNAL SEQUENCE FROM A RECEIVER

BACKGROUND OF THE INVENTION

The present invention relates to a process for obtaining a signal indicating a synchronization error between a pseudo-random signal sequence from a transmitter and a reference pseudo-random signal sequence from a receiver using a measuring device on the receiver end.

German Patent Document No. DE 2,359,716 C3 discloses a measuring device designed as a bit error measuring device because it performs a bit-by-bit comparison of a pseudo-random signal sequence transmitted over a measuring distance with a reference pseudo-random signal sequence generated at the receiving end. An error signal sequence is formed from this bit-by-bit comparison of the two pseudo-random signal sequences and is then analyzed in a circuit configuration to determine whether it matches the pseudo-random signal sequence. If they match, a synchronization error is deduced if a bit error is indicated at the output of the bit error measuring device at the same time.

Furthermore, European Patent Document No. EP 408,936 A2 discloses a process for detecting a character pattern in a data stream. The bit sequence occurring in the data stream is compared with the bit sequence that is sought, so that if the bits in the two patterns match, a corresponding identifier is retransmitted from level to level in a shift register as long as there is an uninterrupted match between the incoming bits and the corresponding bits of the bit pattern that is sought. Retransmission of the so-called identifier in the shift register is interrupted when a single bit does not match. If the identifier occurs at the last level of the shift register or at another defined level, this is a sign that the bits in the data stream match the bits in the bit pattern being sought. Otherwise, it is interpreted as a synchronization error.

The process described above is advantageous since it permits reliable differentiation between so-called bundle errors and synchronization errors between the transmitter and receiver and also works at a relatively high speed in comparison with older known processes. But with regard to time, the known process always requires at least an analysis of the length of the pseudo-random signal sequence in order to detect the synchronization error, so the synchronous status can be restored only after a certain amount of time. This entire period of time is lost with regard to the time for monitoring the quality of a digital signal transmission line and therefore the quality of the measurement results is reduced.

SUMMARY OF THE INVENTION

The present invention improves on the known process in such a way that a synchronization error between a pseudo-random signal sequence from a transmitter and a reference pseudo-random signal sequence from a receiver can be detected more rapidly so the synchronous status can be restored relatively quickly.

According to an embodiment of the present invention, each of the successive sections of the reference pseudo-random signal sequence is cross-correlated with the received pseudo-random signal sequence, yielding partial cross-correlation functions which are added together to obtain a sum cross-correlation function. The maximums of the sum cross-correlation function are detected and monitored for their occurrence in time, and if at least three maximums in the sum cross-correlation function do not occur at the correct time, the signal indicating the synchronization error is generated.

An important advantage of the process according to the present invention is that a synchronization error can be detected relatively quickly, so that measures known from the above-mentioned publication for synchronization between the transmitter and receiver can then be taken. The time for determining the occurrence of a synchronization error in the process according to the present invention is determined by the number of partial cross-correlation functions used to form the sum cross-correlation function. A synchronization error can be detected more rapidly if more partial cross-correlation functions are generated. The process according to the present invention does not depend on the length of the respective pseudo-random signal sequence itself.

In the process according to an embodiment of the present invention, the lengths of the sections of the reference pseudo-random signal sequence can be selected relatively freely and may even differ from each other, because this is taken into account in the analysis. In order to make the process according to the present invention as easy to carry out as possible, it is especially advantageous if successive sections of the reference pseudo-random signal sequence of approximately the same length are cross-correlated with the received pseudo-random signal sequence.

With the process according to the present invention, it is also possible to detect bit errors in the received pseudo-random signal sequence by analyzing the height of the maximums and generating a signal that indicates the bit error while using comparatively little extra resources. This portion of the process may be implemented according to German Patent Document No. DE 4,012,850 A1.

In an advantageous embodiment of the present invention, the process permits reliable detection of a bit slip that occurs on the digital transmission line to be monitored and can be regarded as a phase shift in the pseudo-random signal sequence if the maximums of the sum cross-correlation function are monitored with regard to their occurrence in time to detect a shift in a maximum by a given interval of time. When the defined interval is detected, a status signal that characterizes a bit slip can be generated.

Reliable measurement results can be achieved using a process according to an embodiment of the present invention if the process itself is free of system errors. Monitoring in this regard is performed by monitoring the sum cross-correlation function with regard to the sequence of occurrence of the maximums in accordance with the successive sections of the reference pseudo-random signal sequence, and when a disturbance in the signal sequence is detected, an alarm signal that denotes a system error is generated.

BRIEF DESCRIPTION OF THE DRAWINGS

Other features and advantages of the present invention will become apparent from the following description taken in conjunction with the attached drawings.

DETAILED DESCRIPTION

Figure 1:
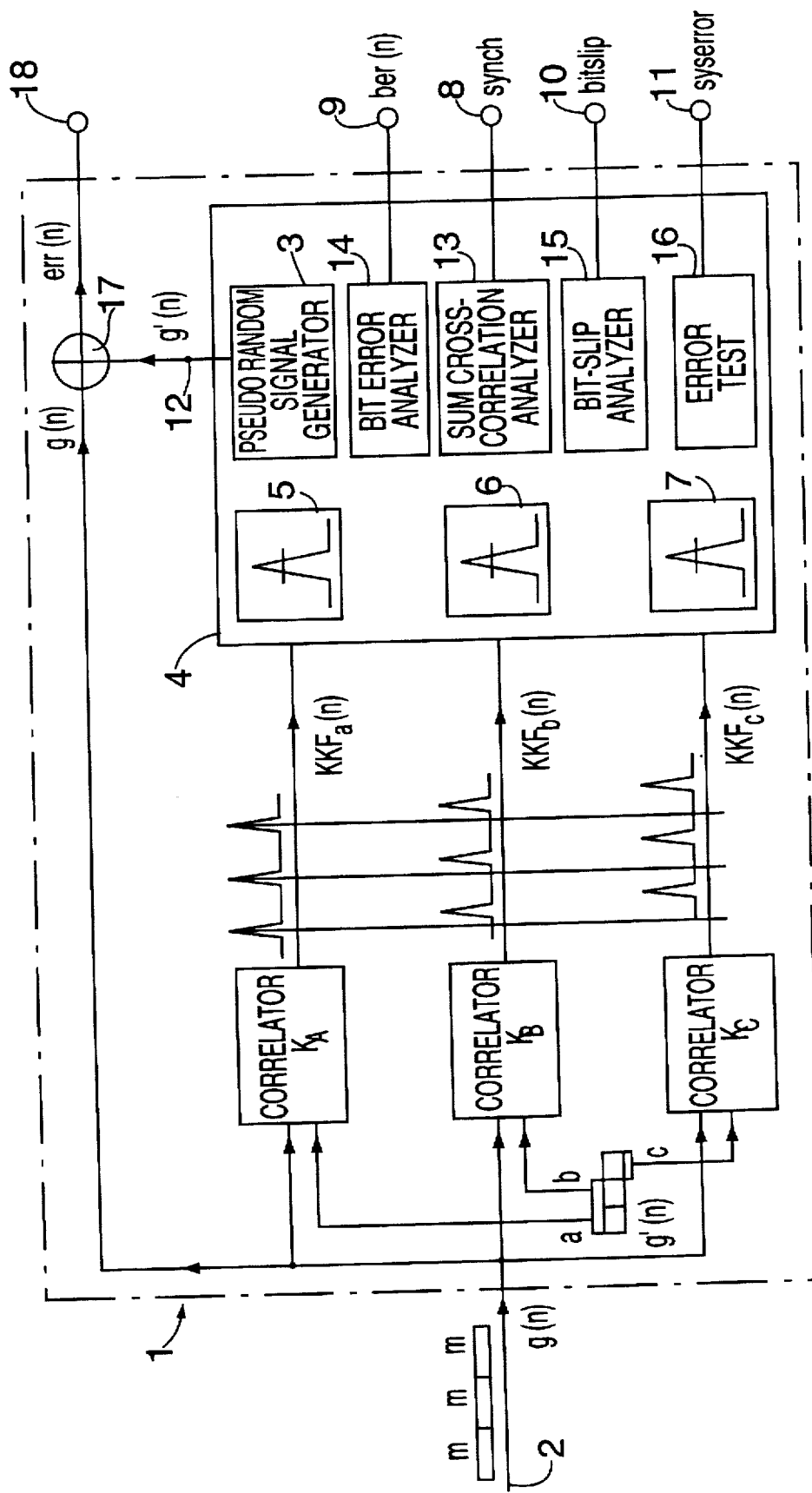
FIG. 1 illustrates an arrangement for carrying out the process according to an embodiment of the present invention in the form of a schematic diagram that illustrates the mode of action only in principle.

According to FIG. 1, a receiver 1 is connected to the end of a digital transmission line 2. A transmitter (not shown in FIG. 1) arranged at the beginning of transmission line 2 may be designed as described in the above-mentioned German Patent Document No. DE 2,359,716 C3, for example. For the purpose of testing the transmission properties, a pseudo-random signal sequence g(n) that preferably consists of m sequences is transmitted through digital transmission line 2. A corresponding reference pseudo-random signal sequence g'(n) is generated at the receiving end in a generator 3 in a measuring device 4 of receiver 1, which may likewise be a feedback shift register. Each reference pseudo-random signal sequence g'(n) of generator 3 is sent to the inputs of three correlators $K_A$, $K_B$ and $K_C$ in this example in such a way that one input of correlator $K_A$ receives a first section a of sequence g'(n), one input of correlator $K_B$ receives the next section b and correlator $K_C$ receives the next section c of the same sequence g'(n). In addition, the pseudo-random signal sequence g(n) is sent to the other inputs of correlators $K_A$, $K_B$ and $K_C$.

As diagrammed schematically in FIG. 1, each reference pseudo-random signal sequence g'(n) is subdivided into sections of equal length in the example shown here. However, this need not necessarily be the case. Thus, a partial cross-correlation is performed in correlators $K_A$, $K_B$ and $K_C$ so partial cross-correlation functions $KKF_a(n)$, $KKF_b(n)$ and $KKF_c(n)$ are formed at the output of correlators $K_A$, $K_B$ and $K_C$. These partial cross-correlation functions are added according to a threshold value analysis by means of threshold detectors 5, 6 and 7 so a sum cross-correlation function $KKF_s(n)$ is available for further analysis, as illustrated in the top diagram a in FIG. 3, where $m_a$, $m_b$ and $m_c$ denote the maximums that are formed in the cross-correlation with the corresponding sections a, b and c of each pseudo-random signal sequence g'(n). Failure of signals to appear at output 8 is interpreted as a synchronization error. As explained in detail below with reference to FIG. 2, FIG. 3, FIG. 4A and FIG. 4B, and especially FIG. 4A and FIG. 4B, a "ber(n)" signal that indicates the number of bit errors is obtained at output 9 of measuring device 4 in the analysis, a "bitslip" signal indicating that a bit slip has occurred is obtained at output 10, and a "syserror" signal indicating a system error is obtained at output 11. Signal g'(n) (with forced synchronization) is obtained at another output 12.

The sum cross-correlation function KKFs(n) is analyzed (in block 13 of measuring device 4) to determine whether its maximums $m_a$, $m_b$ and $m_c$ occur at the expected intervals (at equidistant intervals when the partial cross-correlation functions with equal-length sections a, b and c of the reference pseudo-random signal sequence g'(n) are formed). If this is the case, then signals indicating a synchronous status will appear at output 8 of analyzer 13.

Block 14 of FIG. 1 detects bit errors in the received pseudo-random signal sequence by evaluating the height of the maximums and generating a signal that indicated the bit error. The detector 14 may be implemented, for example, as described in German Patent Document No. DE 40 12 850 A1.

Figure 3:
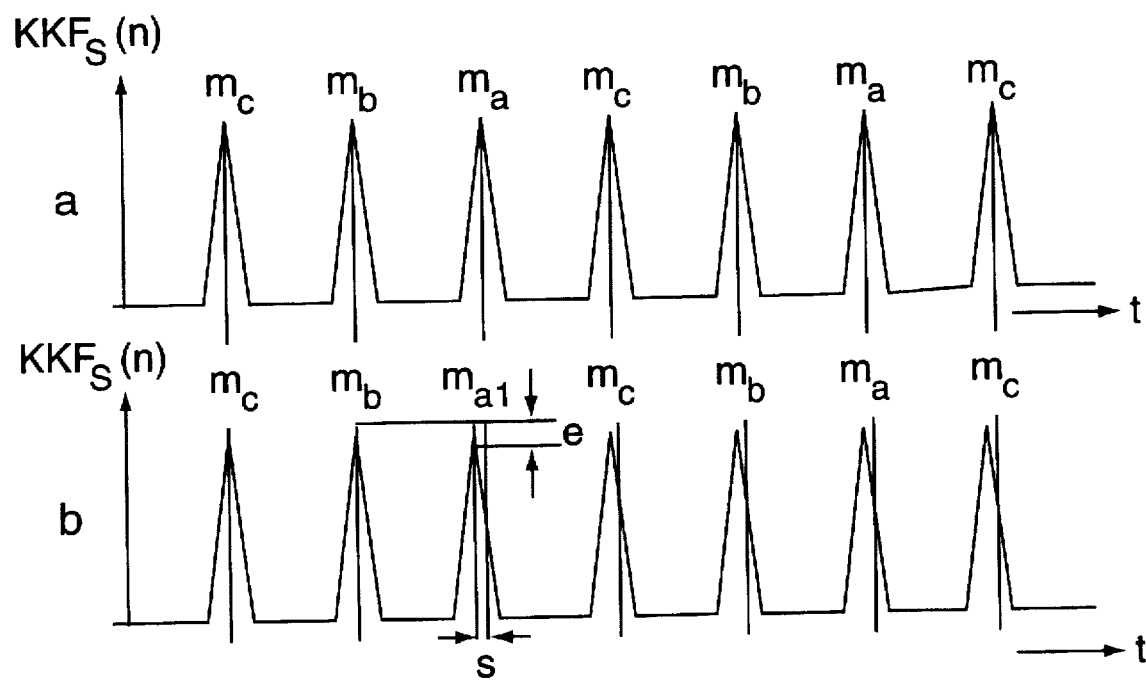
FIG. 3 illustrates the occurrence of maximums in a sum cross-correlation function formed from the partial cross-correlation functions.

In addition, as indicated briefly above, an analysis is performed in block 15 in measuring device 4 to determine whether a bit slip, which can be interpreted as a phase shift in the received pseudo-random signal sequence, has occurred as an error on the digital transmission line. Diagram b in FIG. 3 illustrates the effect of such an error on the sum cross-correlation function $KKF_s(n)$. The maximum $m_{a1}$ occurs sooner than expected by an interval s because of a bit slip. This is utilized to detect the bit slip and a signal is generated at output 10 accordingly.

Furthermore, a test is performed in a block 16 in measuring device 4 to determine whether the method of partial cross-correlation is itself in an error-free state. To do so, a check is performed to determine whether the maximums of the sum cross-correlation function $KKF_s(n)$ follow in the given sequence. If this is not the case, there is an error in the system which is signaled by a "syserror" signal at output 11.

FIG. 1 also shows that the reference pseudo-random signal sequence g'(n) generated in generator 3 is linked with the received pseudo-random signal sequence g(n) in a logic element 17 to generate a bit error function "err(n)" at output 18 such as that described in German Patent No. DE 4,121,480 C1.

Figure 2:
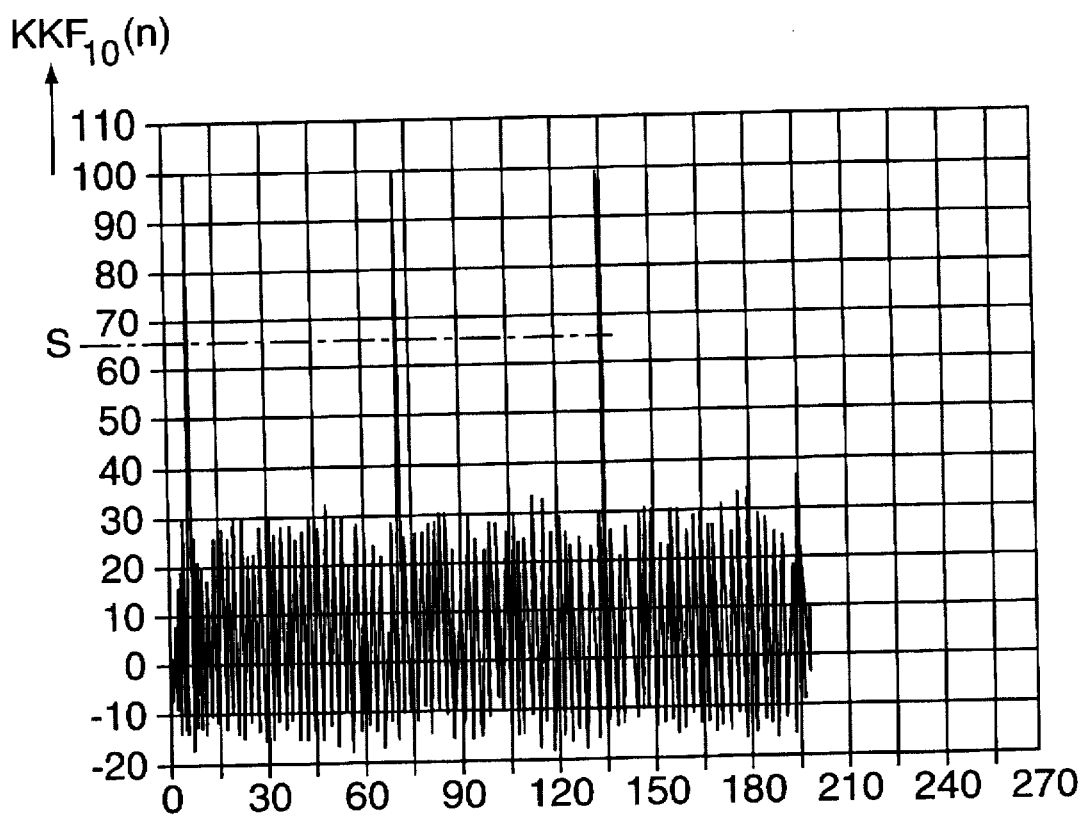
FIG. 2 illustrates a graph of a partial cross-correlation function.

FIG. 2 illustrates the graph of a partial cross-correlation function $KKF_{10}(n)$ as a function of the parameter n in the case where 10 sections of the reference pseudo-random signal sequence g'(n) are each cross-correlated separately as a $2^n$-m sequence with the received pseudo-random signal sequence. It can be seen from this that the first maximum occurs at n=60. Thus, the maximums of the other sections also occur early accordingly, so it is possible to ascertain quickly whether or not a synchronization error has occurred.

In FIG. 2 the height of the threshold value is also entered at approximately 65, because a distinction between the actual maximums of the partial cross-correlation function and the secondary maximums of this function must be made on the basis of this threshold value.

Figure 4A:
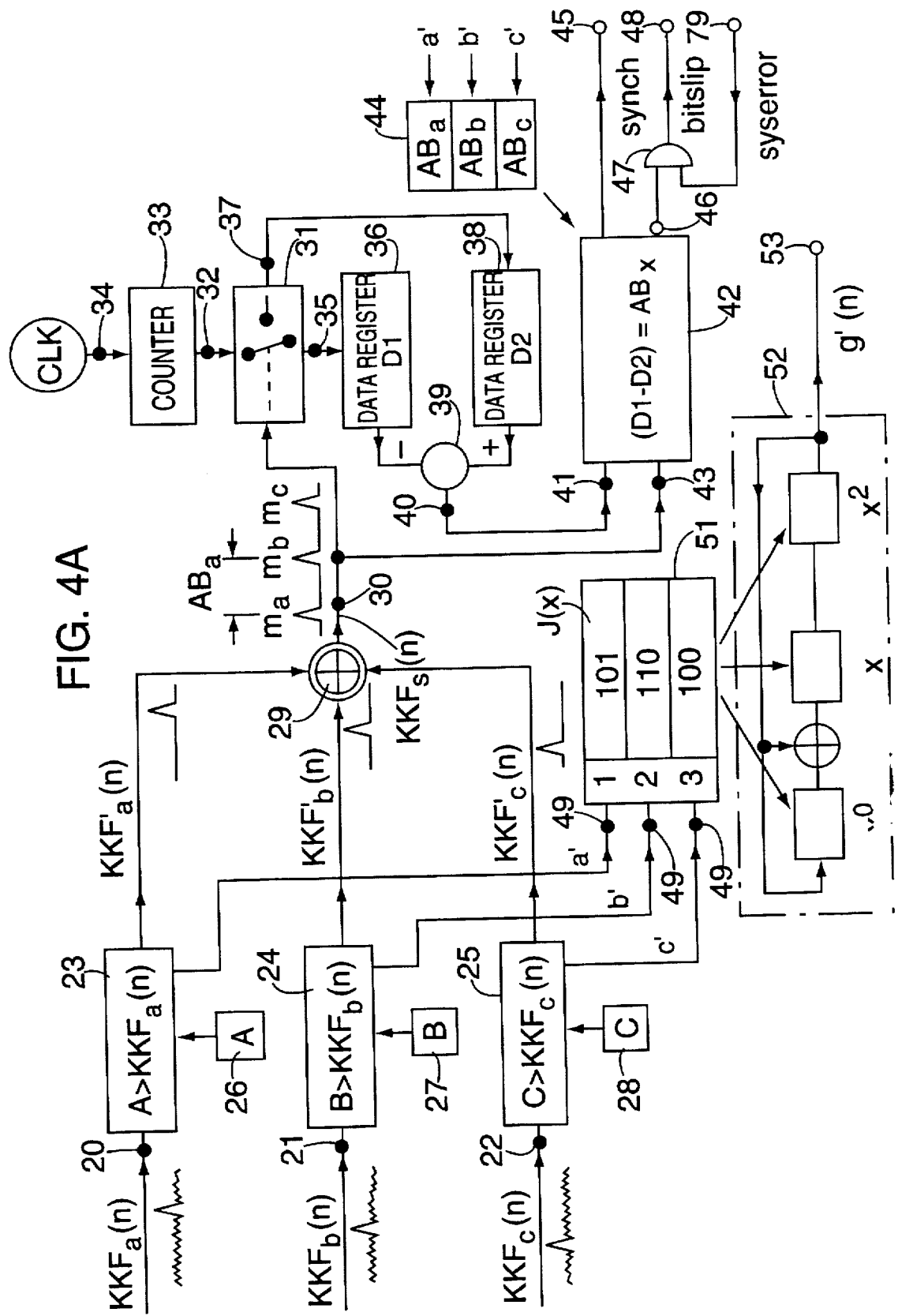
FIG. 4A and FIG. 4B each illustrate one embodiment of the measuring device of the arrangement according to FIG. 1.
Figure 4B:
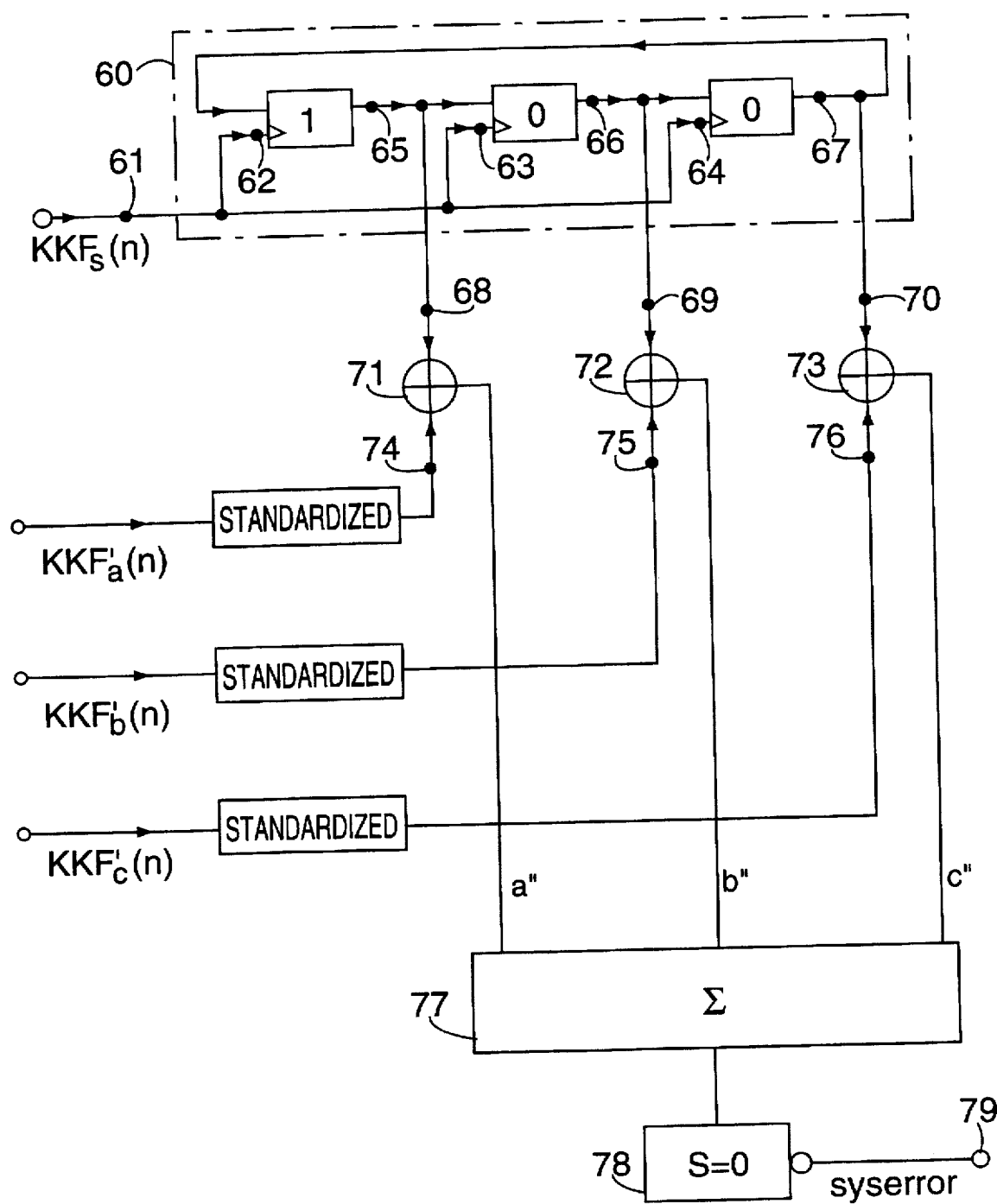

FIG. 4A and FIG. 4B illustrate one embodiment of measuring device 4 according to FIG. 1. As illustrated in FIG. 4A, the partial cross-correlation functions $KKF_a(n)$, $KKF_b(n)$ and $KKF_c(n)$ are sent to inputs 20, 21 and 22 by threshold detectors 23, 24 and 25 which correspond to detectors 5 to 7 illustrated in FIG. 1. One threshold generator 26, 27 and 28 is assigned to each of threshold detectors 23 to 25, so each of the partial cross-correlation functions can be monitored individually with regard to a threshold value A, B or C that can be selected.

If threshold detectors 23 to 25 detect maximums in the partial cross-correlation functions $KKF_a(n)$, $KKF_b(n)$ and $KKF_c(n)$ that are above the selected threshold values A to C, then partial cross-correlation functions $KKF'_a(n)$, $KKF'_b(n)$ and $KKF'_c(n)$ that contain only the detected maximum appear at the output of threshold detectors 23 to 25. These partial cross-correlation functions are added up in a summing unit 29 so a sum cross-correlation function $KKF_s(n)$ appears at its output 30. This sum cross-correlation function consequently contains the maximums of the various partial cross-correlation functions in the chronological sequence in which they occurred.

The sum cross-correlation function $KKF_s(n)$ is sent as a control signal to a switching element 31 that is connected at one input 32 to a counter 33 that is constantly running. This counter 33 receives clock signal 34 of the system as a whole. A data register 36 is connected to one output 35 of switching element 31. Another output 37 of switching element 31 is connected to another data register 38. The outputs of data registers 36 and 38 are connected to a subtractor 39 whose output 40 is in turn connected to an input 41 of a comparator 42. A control input 43 of comparator 42 is connected directly to output 30 of summing unit 29. Comparator 42 is provided with a storage device 44 from which comparative values are loaded into comparator 42 in a manner to be explained below. Then a "synch" signal with a value of "0" can be picked up at an output 45 if synchronization is present. A "synch" signal with a value of "1" indicates a synchronization error. Another (negating) output 46 of the comparator is connected to another output 48 across an AND element 47. A "bitslip" status signal, which has a value of "0" when a bit slip occurs, appears at output 48. AND element 47 also receives the "syserror" alarm signal that indicates a system error.

FIG. 4A also shows that threshold detectors 23 to 25 can provide standardized signals a', b' and c' which assume a value of "1" when threshold detectors 23 to 25 respond. Signals a', b' and c' are sent to address inputs 49 of a storage device 51 which has the memory contents at the various addresses as indicated in FIG. 4A. As also indicated in FIG. 4A, the memory contents are loaded into the various levels of a shift register 52 which then delivers the reference pseudo-random signal sequence g'(n) at its output 53. Output 53 according to FIG. 4A is identical to output 12 according to FIG. 1.

A system error "syserror" is detected by the circuit part illustrated in FIG. 4B which contains, among other things, an additional shift register 60. The sum cross-correlation function $KKF_s(n)$ is sent as a clock signal to this shift register via a connecting line 61. This is accomplished by having line 61 connected to one input 62, 63 and 64 of each level of additional shift register 60. A value of "1" is advanced by the clock signal to the next level in additional shift register 60.

Outputs 65, 66 and 67 of the individual levels of additional shift register 60 are each connected to inputs 68, 69 and 70, respectively, of exclusive-OR elements 71, 72 and 73. A partial cross-correlation function $KKF_a(n)$, $KKF_b(n)$ or $KKF_c(n)$ appears in standardized form at the other inputs 74, 75, and 76 of exclusive-OR elements 71 to 73. Standardized in this case means that the partial cross-correlation functions yield a "1" signal when they have a maximum, but assume a value of "0" when there is no maximum present. At the output end, exclusive-OR elements 71 to 73 are connected to a checksum forming device 77 where the checksum of output signals a", b" and c" of exclusive-OR elements 71 to 73 are formed. The value of the checksum is analyzed in a downstream component 78 to determine whether it has a value of 0. If this is the case, then there is no system error and consequently a corresponding "1" signal appears at output 79 as a result of negation.

The arrangement according to FIG. 4A and FIG. 4B operates so that the partial cross-correlation functions $KKF_a(n)$ to $KKF_c(n)$ are each analyzed in threshold detectors 23 to 25 to determine whether they have a pronounced maximum. If they do, then suitably weighted partial cross-correlation functions $KKF_a(n)$ to $KKF_c(n)$, each of which contains only one maximum value, are formed. These weighted functions are added in summing unit 29, so the sum cross-correlation function $KKF_s(n)$ has maximums $m_a$, $m_b$ and $m_c$ at chronological intervals that correspond to the respective section lengths used to form the partial cross-correlation functions from the reference pseudo-random signal sequence g'(n). Clock pulses controlled by the maximums $m_a$, $m_b$ and $m_c$ are received in data register 36 via switch 31. For example, switch 31 is controlled by maximum ma in such a way that data register 36 receives a signal. When the next maximum $m_b$ occurs, the other data register 38 receives clock pulses, so a value that corresponds to the difference between the counter readings of data registers 36 and 38 appears at output 40 of subtractor 39.

This difference between the counter readings is compared in comparator 42 with a preset value $AB_b$ that has been loaded from storage device 44 into comparator 42 for this sequence of maximums of the sum cross-correlation function $KKF_s(n)$. If this difference between counter readings corresponds to the value $AB_b$ loaded into comparator 42 and if the same thing is true with regard to the interval between maximums $m_b$ and $m_c$ in comparison to the value $AB_c$ in storage device 44, then the received pseudo-random signal sequence g(n) and the reference pseudo-random signal sequence g'(n) are in synchronization and a "synch" signal with a value of "0" appears at output 45. Otherwise, this signal has a value of "1" which indicates a synchronization error.

To detect a bit slip, when a "bitslip" signal with a value "0" appears, a check is performed in a manner that is not described in detail here to determine whether this signal appears for a short period of time. A bit slip is deduced from this information.

We claim:

1. A process for obtaining a signal that indicates a synchronization error between a pseudo-random signal sequence from a transmitter and a reference pseudo-random signal sequence from a receiver by means of a measuring device on the receiving end, comprising steps of:

a) separately cross-correlating successive sections of a reference pseudo-random signal sequence in succession with a received pseudo-random signal sequence yielding partial cross-correlation functions;

b) adding the partial cross-correlation functions to yield a sum cross-correlation function;

c) detecting maximums of the sum cross-correlation function and monitoring a chronological occurrence of the detected maximums; and d) if at least three detected maximums in the sum cross-correlation function do not appear at a predetermined time, generating a signal indicating a synchronization error.

2. A process according to claim 1, further comprising a step of:

e) cross-correlating successive sections of the reference pseudo-random signal sequence of approximately the same length with the received pseudo-random signal sequence.

3. A process according to claim 2, further comprising a step of:

f) analyzing a value of the detected maximums and generating a signal indicating a bit error.

4. A process according to claim 3, further comprising steps of:

g) monitoring the detected maximums of the sum cross-correlation function with regard to their chronological occurrence to detect a shift in a maximum by a predetermined interval of time; and h) upon detection of the predetermined interval, generating a status signal indicating that a bit slip is generated.

5. A process according to claim 4, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

6. A process according to claim 3, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

7. A process according to claim 2, further comprising steps of:

g) monitoring the detected maximums of the sum cross-correlation function with regard to their chronological occurrence to detect a shift in a maximum by a predetermined interval of time; and h) upon detection of the predetermined interval, generating a status signal indicating that a bit slip is generated.

8. A process according to claim 7, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

9. A process according to claim 2, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

10. A process according to claim 1, further comprising a step of:

f) analyzing a value of the detected maximums and generating a signal indicating a bit error.

11. A process according to claim 10, further comprising steps of:

g) monitoring the detected maximums of the sum cross-correlation function with regard to their chronological occurrence to detect a shift in a maximum by a predetermined interval of time; and h) upon detection of the predetermined interval, generating a status signal indicating that a bit slip is generated.

12. A process according to claim 11, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

13. A process according to claim 10, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

14. A process according to claim 1, further comprising steps of:

g) monitoring the detected maximums of the sum cross-correlation function with regard to their chronological occurrence to detect a shift in a maximum by a predetermined interval of time; and h) upon detection of the predetermined interval, generating a status signal indicating that a bit slip is generated.

15. A process according to claim 14, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

16. A process according to claim 1, further comprising steps of:

i) monitoring the sum cross-correlation function with regard to the sequence of occurrence of the maximums in accordance with successive sections of the reference pseudo-random signal sequence; and j) when a disturbance in the sequence is detected, generating an alarm signal indicating a system error.

* * * * *